(12) United States Patent
Dong et al.

(10) Patent No.: US 12,166,216 B2
(45) Date of Patent: Dec. 10, 2024

(54) BATTERY AND ELECTRIC DEVICE CONTAINING SAME

(71) Applicant: Ningde Amperex Technology Limited, Ningde (CN)

(72) Inventors: Gang Dong, Ningde (CN); Kai Wu, Ningde (CN); Peipei Guo, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 67 days.

(21) Appl. No.: 17/707,314

(22) Filed: Mar. 29, 2022

(65) Prior Publication Data

US 2022/0416331 A1 Dec. 29, 2022

(30) Foreign Application Priority Data

Jun. 28, 2021 (CN) .......................... 202110717836.3

(51) Int. Cl.
*H01M 50/102* (2021.01)
*H01M 50/136* (2021.01)
(Continued)

(52) U.S. Cl.
CPC ....... *H01M 50/102* (2021.01); *H01M 50/136* (2021.01); *H01M 50/202* (2021.01);
(Continued)

(58) Field of Classification Search
CPC ............ H01M 10/124; H01M 10/285; H01M 50/109; H01M 50/153; H01M 50/181;
(Continued)

(56) References Cited

U.S. PATENT DOCUMENTS

2010/0159308 A1* 6/2010 Kim .................... H01M 50/166
429/185
2013/0130066 A1* 5/2013 Pytlik .................... H01M 6/50
429/7
(Continued)

FOREIGN PATENT DOCUMENTS

CN 1286506 A * 3/2001 ........ H01M 10/0427
EP 3082179 A * 10/2016
(Continued)

OTHER PUBLICATIONS

First Office Action of CN application No. 202110717836.3, dated May 21, 2023.

*Primary Examiner* — Matthew T Martin
*Assistant Examiner* — Bartholomew A Hornsby
(74) *Attorney, Agent, or Firm* — Ladas & Parry LLP (57) ABSTRACT

A battery including a housing assembly, an electrode assembly, and a conductive assembly. The housing assembly includes a first housing fixed on a second housing. The second housing is provided with a cavity and includes a bottom plate. The electrode assembly is disposed in the cavity. The bottom plate contains an elastic portion protruding toward the first housing. The electrode assembly includes a first electrode plate and a second electrode plate stacked together. A surface of the first electrode plate facing back from a center of the electrode assembly contains a first blank foil region uncoated with a first active material and electrically connected to the conductive assembly. A surface of the second electrode plate facing back from the center of the electrode assembly contains a second blank foil region uncoated with a second active material. The elastic portion is electrically connected to the second blank foil region.

17 Claims, 4 Drawing Sheets

(51) Int. Cl.
    *H01M 50/202*     (2021.01)
    *H01M 50/531*     (2021.01)
    *H01M 50/588*     (2021.01)

(52) U.S. Cl.
    CPC ....... *H01M 50/531* (2021.01); *H01M 50/588* (2021.01); *H01M 2200/106* (2013.01); *H01M 2220/30* (2013.01)

(58) Field of Classification Search
    CPC . H01M 50/216; H01M 50/553; H01M 50/559
    See application file for complete search history.

(56) References Cited

U.S. PATENT DOCUMENTS

| | | | |
|---|---|---|---|
| 2015/0221925 A1* | 8/2015 | Kim | H01M 10/0463 |
| | | | 429/61 |
| 2019/0229321 A1 | 7/2019 | Liu et al. | |
| 2021/0028460 A1* | 1/2021 | Xiaowei | H01M 4/622 |
| 2021/0104710 A1* | 4/2021 | Watanabe | H01G 11/80 |
| 2022/0181619 A1* | 6/2022 | Momma | H01M 4/0471 |
| 2023/0127368 A1* | 4/2023 | Yun | H01M 50/578 |
| | | | 429/163 |

FOREIGN PATENT DOCUMENTS

| | | |
|---|---|---|
| EP | 3082179 A1 | 10/2016 |
| JP | H02288063 A | 11/1990 |
| JP | H11273651 A | 10/1999 |
| JP | 2011134663 A | 7/2011 |
| KR | 970025885 U | 6/1997 |
| KR | 20190033026 A * | 3/2019 |
| WO | WO-2012121468 A1 * | 9/2012 .......... H01M 2/0413 |

\* cited by examiner

BATTERY AND ELECTRIC DEVICE CONTAINING SAME

CROSS REFERENCE TO THE RELATED APPLICATION

This application claims priority to the Chinese Patent Application No. 202110717836.3 filed on Jun. 28, 2021, the entire content of which is incorporated herein by reference.

TECHNICAL FIELD

This application relates to a battery and an electric device containing same.

BACKGROUND

With popularization of consumer electronics products such as a notebook computer, a mobile phone, a handheld game console, a tablet computer, and a mobile power supply, people are posing higher requirements on an electrochemical device (such as a lithium-ion battery).

However, high energy density and safety of the electrochemical device still cannot be ensured effectively.

SUMMARY

To overcome the foregoing disadvantages in the prior art, it is necessary to provide a battery.

In addition, it is necessary to provide an electric device containing the battery.

This application provides a battery, including a housing assembly, an electrode assembly, and a conductive assembly. The housing assembly includes a first housing and a second housing. The first housing is fixed on the second housing. The second housing is provided with a cavity, and the second housing includes a bottom plate. The electrode assembly is disposed in the cavity. The bottom plate contains an elastic portion that protrudes toward the first housing. The electrode assembly includes stacked electrode plates. The electrode plates include a first electrode plate and a second electrode plate that are located on a top layer and a bottom layer respectively. A surface that is of the first electrode plate and that faces back from a center of the electrode assembly contains a first blank foil region uncoated with a first active material. A surface that is of the second electrode plate and that faces back from the center of the electrode assembly contains a second blank foil region uncoated with a second active material. The conductive assembly is electrically connected to the first blank foil region. The elastic portion is configured to abut and be electrically connected to the second blank foil region.

In this application, the electrode assembly abuts in the housing assembly firmly by using the elastic portion of the bottom plate of the second housing, so that the first electrode plate and the second electrode plate are contacted with and electrically connected to the conductive assembly and the second housing respectively. This improves the reliability of the electrical connection, and reduces the hazards of an internal short circuit caused by weld burrs or weld marks piercing the separator, thereby improving the safety. In this application, it is not necessary to lead the polarity of the electrode plate out to the conductive assembly and the second housing by welding, thereby helping to simplify the process and reduce the cost. In addition, in this application, a transfer bonding structure on the tab is omitted, and just a single side of the first electrode plate and a single side of the second electrode plate are coated with the active material, thereby helping to increase the energy density of the battery.

In some possible embodiments, the elastic portion contains a first position and a second position. At the first position, the elastic portion abuts and is electrically connected to the second blank foil region. At the second position, the elastic portion is separated from the second blank foil region. Therefore, when the battery generates gas during high-temperature cycling, overcharging, over-discharging, or the like, the elastic portion can be elastically deformed and switch to the second position, so as to cut off the electrical connection between the electrode assembly and the external circuit, thereby improving the safety performance of the battery.

In some possible embodiments, the elastic portion is arc-shaped.

In some possible embodiments, a height of the elastic portion (that is, a distance from a highest point of the elastic portion to a plane containing an inner surface of the second housing at a bottom side of the second housing) is $1/100$ to $1/5$ of the height of the second housing. This not only ensures that the elastic portion abuts and is electrically connected to the conductive assembly, but also ensures a relatively high energy density.

In some possible embodiments, the bottom plate further includes a connecting portion, and the connecting portion is connected to a side edge of the elastic portion. In a first direction that is defined as a stacking direction of the electrode plates, the elastic portion is disposed between the connecting portion and the electrode assembly.

In some possible embodiments, the battery further includes a blocking piece. The blocking piece is disposed on a surface that is of the elastic portion and that faces the second electrode plate. The blocking piece is configured to block an electrical connection between the second blank foil region and the elastic portion when the electrode assembly generates heat abnormally. Therefore, the safety of the battery is further improved.

In some possible embodiments, the blocking piece includes a positive temperature coefficient material. Therefore, a resistance value of the blocking piece increases when the temperature reaches a preset value, thereby blocking the electrical connection between the electrode assembly and the second housing.

In some possible embodiments, the second housing includes a composite material compounded of a conductive material and a positive temperature coefficient material. Therefore, the second housing not only possesses conductivity to implement the electrical connection to the second electrode plate, but also is capable of automatically blocking under a high temperature. When the electrode assembly generates heat abnormally, the second housing can block the electrical connection from the second electrode plate.

In some possible embodiments, the battery further includes an insulation piece. The insulation piece is configured to bond the first housing and the conductive assembly. The insulation piece is further configured to electrically insulate the conductive assembly from the first housing.

In some possible embodiments, the conductive assembly includes a pedestal and a protruding rod disposed on the pedestal. The first housing is provided with a via hole. The protruding rod is disposed in the via hole. The pedestal is disposed between the first blank foil region and the first housing. By disposing the conductive assembly that includes the pedestal, this application can ensure the reliability of the electrical connection between the conductive assembly and the first blank foil region. In addition, in contrast to the traditional electrode post, this solution can reduce the short circuit hazards caused by the electrode post piercing the electrode plate during a crush test.

This application further provides an electric device. The electric device includes a main body and the battery described above. The battery is disposed in the main body.

REFERENCE NUMERALS OF MAIN COMPONENTS

Electric device 1
Main body 2
Housing assembly 10
First housing 11
Second housing 12
Electrode assembly 20
Electrode plate 21
First electrical connecting piece 22
Second electrical connecting piece 23
Conductive assembly 30
Pedestal 31
Protruding rod 32
Blocking piece 40
Insulation piece 50
First insulation portion 51
Second insulation portion 52
Battery 100
Through hole 110
Cavity 120
Bottom plate 121
Sidewall 122
First electrode plate 211
Second electrode plate 212
Elastic portion 1211
Connecting portion 1212
First current collector 2111
First active material layer 2112
Second current collector 2121
Second active material layer 2122
First blank foil region A
Second blank foil region B
Center O
First direction $D_1$
Second direction $D_2$
Radius R
Thickness $T_1$, $T_2$, $T_3$, $T_4$, $T_5$
Width $W_1$, $W_2$, $W_3$, $W_4$, $W_5$ This application is further described below with reference to the following specific embodiments and the foregoing drawings.

DETAILED DESCRIPTION

The following describes the technical solutions in the embodiments of this application clearly and thoroughly. Evidently, the described embodiments are merely a part of but not all of the embodiments of this application. Unless otherwise defined, all technical and scientific terms used herein have the same meanings as usually understood by those skilled in the art. The terms used in the specification of this application are merely intended for describing specific embodiments but not intended to limit this application.

The following describes the embodiments of this application in detail.

However, this application may be embodied in many different forms, and is in no way construed as being limited to the exemplary embodiments described herein. Rather, the exemplary embodiments are provided to disclose this application thoroughly in detail to those skilled in the art.

In addition, for brevity and clarity, the size or thickness of various components and layers in the drawings may be enlarged. Throughout the text, the same reference numerical means the same element. As used herein, the term "and/or" includes any and all combinations of one or more related items preceding and following the term. In addition, understandably, when an element A is referred to as "connecting" an element B, the element A may be directly connected to the element B, or an intermediate element C may exist through which the element A and the element B can be connected to each other indirectly.

Further, the term "may" used in describing an embodiment of this application means "one or more embodiments of this application".

The technical terms used herein is intended to describe specific embodiments but not intended to limit this application. Unless otherwise expressly specified in the context, a noun used herein in the singular form includes the plural form thereof. Further, understandably, the terms "include", "comprise", and "contain" used herein mean existence of the feature, numerical value, step, operation, element and/or component under discussion, but do not preclude the existence or addition of one or more other features, numerical values, steps, operations, elements, components, and/or any combinations thereof.

Space-related terms, such as "on", may be used herein for ease of describing the relationship between one element or feature and other element (elements) or feature (features) as illustrated in the drawings. Understandably, the space-related terms are intended to include different directions of a device or apparatus in use or operation in addition to the directions illustrated in the drawings. For example, if a device in the drawing is turned over, an element described as "above" or "on" another element or feature will be oriented "under" or "below" the other element or feature. Therefore, the exemplary term "on" includes both an up direction and a down direction. Understandably, although the terms such as first, second, third may be used herein to describe various elements, components, regions, layers and/or parts, such elements, components, regions, layers and/or parts are not limited by the terms. Such terms are intended to distinguish one element, component, region, layer or part from another element, component, region, layer, or part. Therefore, a first element, a first component, a first region, a first layer, or a first part mentioned below may be referred to as a second element, a second component, a second region, a second layer, or a second part, without departing from the teachings of the exemplary implementations.

Referring to FIG. 1 to FIG. 4, an embodiment of this application provides a battery 100, including a housing assembly 10, an electrode assembly 20, and a conductive assembly 30.

Figure 1:
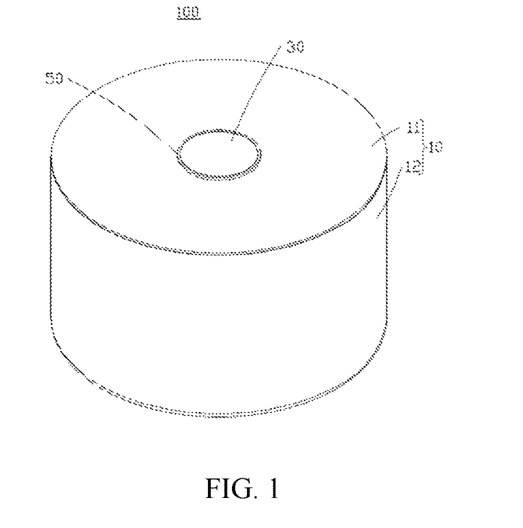
FIG. 1 is a three-dimensional diagram of a battery according to an embodiment of this application.
Figure 2:
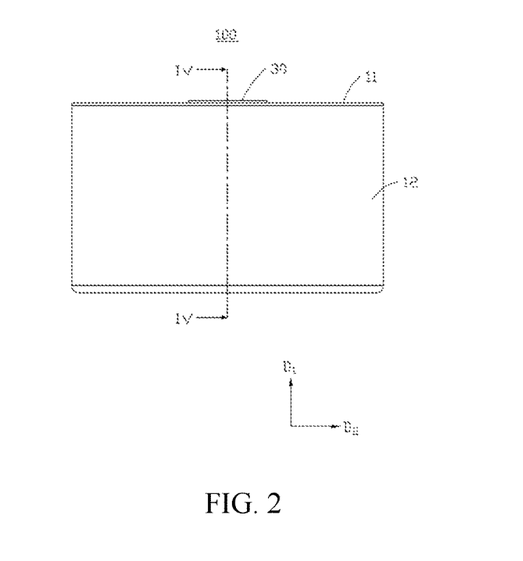
FIG. 2 is a front view of the battery shown in FIG. 1.
Figure 3:
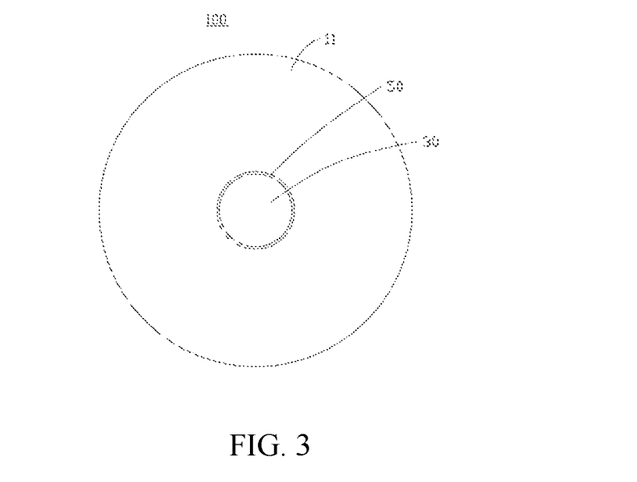
FIG. 3 is a top view of the battery shown in FIG. 1.
Figure 4:
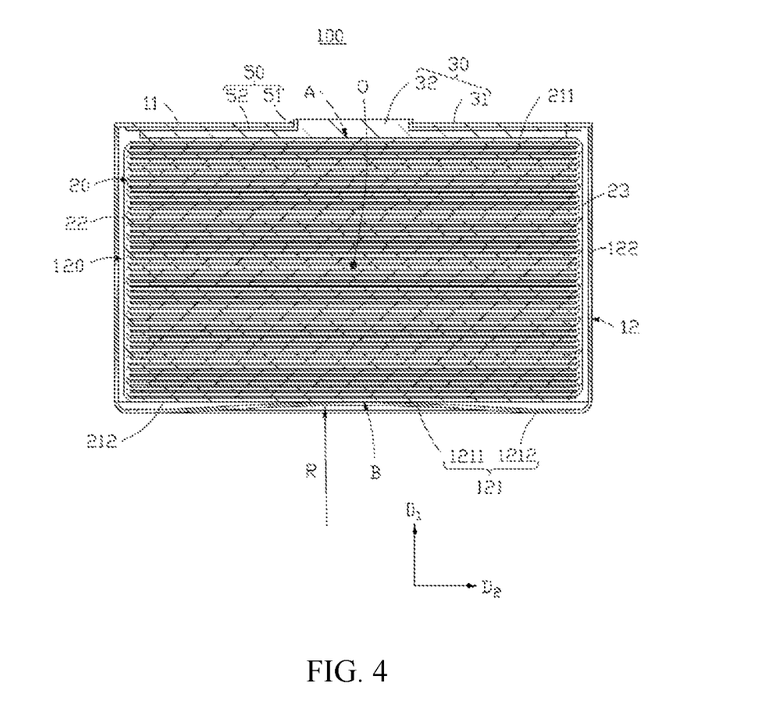
FIG. 4 is a sectional view of the battery shown in FIG. 2 and sectioned along an IV-IV line.

The housing assembly 10 includes a first housing 11 and a second housing 12. The first housing 11 is fixed on the second housing 12. Specifically, the second housing 12 includes a bottom plate 121 and a sidewall 122 connected to the bottom plate 121. The first housing 11 is fixed to a side that is of the sidewall 122 and that is away from the bottom plate 121. The bottom plate 121 and the sidewall 122 jointly close in to form a cavity 120. The electrode assembly 20 is disposed in the cavity 120. The bottom plate 121 contains an elastic portion 1211. The elastic portion 1211 protrudes toward the first housing 11.

Figure 5:
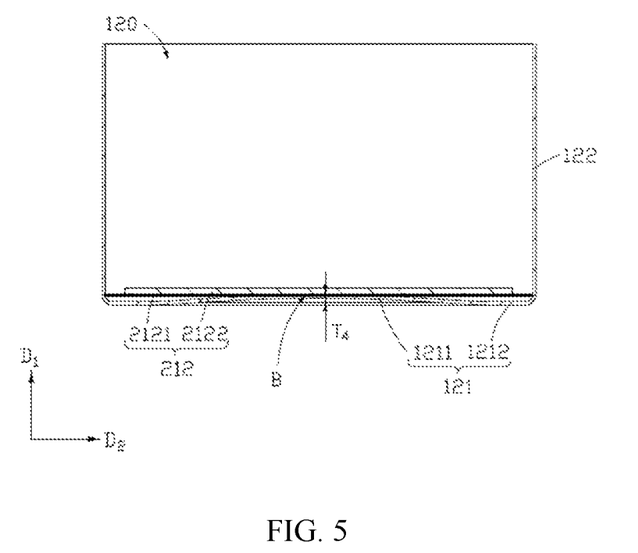
FIG. 5 is a sectional view of the battery shown in FIG. 4 and sectioned at a second housing.
Figure 7:
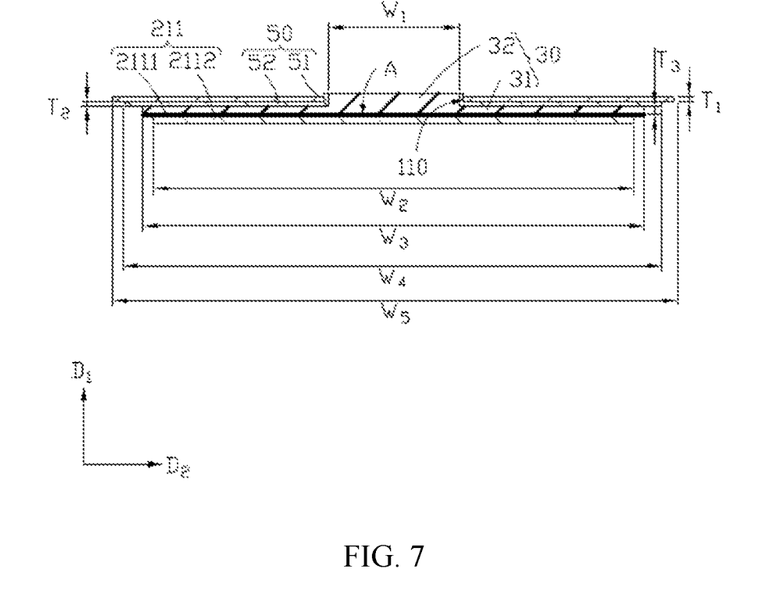
FIG. 7 is a sectional view of the battery shown in FIG. 4 and sectioned at a first housing.

As shown in FIG. 4, the electrode assembly 20 is a stacked structure. The electrode assembly 20 includes a plurality of electrode plates 21 that are stacked together and a separator (not shown in the drawing) disposed between two adjacent electrode plates 21. The electrode plates 21 include a first electrode plate 211 and a second electrode plate 212 that are located on the top layer and the bottom layer respectively. To be specific, the first electrode plate 211 faces the first housing 11, and the second electrode plate 212 faces the bottom plate 121. The polarity of the first electrode plate 211 is opposite to the polarity of the second electrode plate 212. Referring to FIG. 5 and FIG. 7, the first electrode plate 211 includes a first current collector 2111 and a first active material layer 2112 disposed on a surface of the first current collector 2111. The second electrode plate 212 includes a second current collector 2121 and a second active material layer 2122 disposed on a surface of the second current collector 2121.

In some embodiments, the battery 100 is a button battery. In other embodiments, the battery 100 may be another type of battery instead.

In some embodiments, the first electrode plate 211 is a positive electrode plate, and the second electrode plate 212 is a negative electrode plate. Correspondingly, the first current collector 2111 is a positive current collector, and the first active material layer 2112 is a positive active material layer. The second current collector 2121 is a negative current collector, and the second active material layer 2122 is a negative active material layer. Instead, in other embodiments, the first electrode plate 211 and the second electrode plate 212 may be a negative electrode plate and a positive electrode plate respectively, without being limited in this application.

The positive current collector may be an aluminum foil, or may be another type of current collector commonly used in the art instead. The thickness of the positive current collector may be 1 µm to 50 µm. In some embodiments, the negative current collector may be at least one of a copper foil, a nickel foil, or a carbon-based current collector. The thickness of the negative current collector may be 1 µm to 50 µm.

The positive active material layer includes a positive active material (a first active material). The positive active material includes a compound in which lithium ions can be intercalated reversibly and from which lithium ions can be deintercalated reversibly (that is, a lithiated intercalation compound). In some embodiments, the positive active material may include lithium transition metal composite oxide. The lithium transition metal composite oxide contains lithium and at least one element selected from cobalt, manganese, or nickel. In some embodiments, the positive active material is at least one selected from: lithium cobalt oxide ($LiCoO_2$), lithium nickel-cobalt-manganese ternary material (NCM), lithium manganese oxide ($LiMn_2O_4$), lithium nickel manganese oxide ($LiNi_{0.5}Mn_{1.5}O_4$), or lithium iron phosphate ($LiFePO_4$).

The negative active material layer contains a negative active material (a second active material). The negative active material includes a negative active material from which active ions can be deintercalated reversibly. In some embodiments, the negative active material may be one of or any combination of graphite, soft carbon, hard carbon, carbon fiber, mesocarbon microbeads, silicon-based material, tin-based material, lithium titanium oxide, or other metals that can combine with lithium into an alloy. The graphite may be one of or any combination of artificial graphite, natural graphite, or modified graphite. The silicon-based material may be one of or any combination of simple-substance silicon, a silicon-oxygen compound, a silicon-carbon composite, a silicon alloy, or the like. The tin-based material may be one of or any combination of simple-substance tin, a tin-oxide compound, a tin alloy, or the like.

The separator includes at least one of polyethylene, polypropylene, polyvinylidene fluoride, polyethylene terephthalate, polyimide, or aramid fiber. For example, the polyethylene includes at least one of high-density polyethylene, low-density polyethylene, or ultra-high-molecular-weight polyethylene. Especially, the polyethylene and the polypropylene are highly effective in preventing short circuits, and improve stability of the battery 100 through a turn-off effect. In some embodiments, the thickness of the separator is within a range of approximately 5 µm to 50 µm.

As shown in FIG. 4 and FIG. 7, a surface that is of the first current collector 2111 and that faces back from a center O of the electrode assembly 20 contains a first blank foil region A uncoated with the first active material. As shown in FIG. 4 and FIG. 5, a surface that is of the second current collector 2121 and that faces back from the center O of the electrode assembly 20 contains a second blank foil region B uncoated with the second active material. The first blank foil region A and the second blank foil region B may serve as two output ends of the electrode assembly 20 respectively. The conductive assembly 30 is electrically connected to the first blank foil region A, so that the conductive assembly 30 possesses the same polarity as the first electrode plate 211. The elastic portion 1211 is configured to abut and be electrically connected to the second blank foil region B, so that the second housing 12 possesses the same polarity as the second electrode plate 212. In some embodiments, the entire surface that is of the first current collector 2111 and that faces back from the center O of the electrode assembly 20 is a blank foil region. The entire surface that is of the second current collector 2121 and that faces back from the center O of the electrode assembly 20 is a blank foil region. In an embodiment, the center O of the electrode assembly 20 is a geometric center of the electrode assembly 20.

The battery 100 can be assembled by just putting the electrode assembly 20 into the cavity 120 of the second housing 12, fixing the first housing 11 to the second housing 12, and then injecting an electrolytic solution into the cavity 120. Therefore, in this case, the elastic portion 1211 of the second housing 12 protrudes toward the first housing 11. Therefore, in this case, the protruding elastic portion 1211 causes the electrode assembly 20 to firmly abut in the housing assembly 10, and causes the first electrode plate 211 and the second electrode plate 212 to be electrically connected to the conductive assembly 30 and the elastic portion 1211 respectively. Further, the battery 100 is chemically formed after being assembled. Generally, the thickness of the electrode assembly 20 increases after the chemical formation. In this way, the electrode assembly 20 contacts the conductive assembly 30 and the elastic portion 1211 more closely, thereby further improving the reliability of the electrical connection between the electrode assembly 20 and the conductive assembly 30 and the elastic portion 1211.

The battery 100 further includes a first electrical connecting piece 22 and a second electrical connecting piece 23. The first electrical connecting piece 22 electrically connects the first current collector 2111 and the current collectors of other electrode plates 21 that possess the same polarity as the first current collector 2111. In this way, all the current collectors of the same polarity are electrically connected to the corresponding output ends of the electrode assembly 20. The second electrical connecting piece 23 electrically connects the second current collector 2121 and the current collectors of other electrode plates 21 that possess the same polarity as the second current collector 2121. In this way, all the current collectors of the same polarity are electrically connected to the corresponding output ends of the electrode assembly 20. In some embodiments, an integral part of the current collector of the electrode plate 21 extends to form a tab. The first electrical connecting piece 22 and the second electrical connecting 23 are electrically connected to the corresponding current collectors respectively by the tab.

Understandably, the conduction of electrons can be implemented as well by the following process: welding the positive tab and the negative tab onto the current collector of the positive electrode plate and the current collector of the negative electrode plate respectively, welding the negative tab to the second housing of the housing assembly, and welding the positive tab to the conductive assembly. However, the plurality of welding steps increase the complexity and cost of the manufacturing process. Moreover, the welding is prone to problems such as solder skip, rosin joint, and over-welding, consequently affecting the reliability of the electrical connection. In addition, the burrs or weld marks arising from the welding may pierce the separator and cause an internal short circuit. On the other hand, for a battery containing a plurality of tabs, the plurality of tabs usually need to be clustered and then transfer-bonded to a metal plate, and then led out to the second housing or the conductive assembly through the metal plate. However, the transfer bonding makes the tab structure complicated and reduces the energy density of the battery.

In this application, the electrode assembly 20 abuts in the housing assembly 10 firmly by using the elastic portion 1211 of the second housing 12, so that the first electrode plate 211 and the second electrode plate 212 contact and are electrically connected to the conductive assembly 30 and the second housing 12 respectively. This improves the reliability of the electrical connection, and reduces the hazards of an internal short circuit caused by weld burrs or weld marks piercing the separator, thereby improving the safety. Moreover, in this application, it is not necessary to lead the polarity of the electrode plate out to the conductive assembly 30 and the second housing 12 by welding, thereby helping to simplify the process and reduce the cost. In addition, in this application, a transfer bonding structure on the tab is omitted, and just a single side of the first electrode plate 211 and a single side of the second electrode plate 212 are coated with the active material layer (that is, the first electrode plate 211 and the second electrode plate 212 each omit one active material layer), thereby helping to increase the energy density of the battery 100.

As shown in FIG. 4, in some embodiments, the bottom plate 121 further includes a connecting portion 1212 connected to a side edge of the elastic portion 1211. In a first direction $D_1$, where the first direction $D_1$ is defined as a stacking direction of the electrode plates 21, the elastic portion 1211 is disposed between the connecting portion 1212 and the electrode assembly 20. In some embodiments, the elastic portion 1211 is integrally connected to the connecting portion 1212, and the elastic portion 1211 is formed by protruding a central part of the bottom plate 121 toward the first housing 11 (that is, by recessing). During preparation, the elastic portion 1211 may be formed on the bottom plate 121 by stamping.

In some embodiments, due to elasticity, the elastic portion 1211 is elastically deformable, so that the elastic portion 1211 contains a first position and a second position. At the first position, the elastic portion 1211 abuts and is electrically connected to the second blank foil region B, so that the elastic portion 1211 is electrically connected to the second electrode plate 212. At the second position, the elastic portion 1211 is separated from the second blank foil region B, so that the elastic portion 1211 is electrically disconnected from the second electrode plate 212. Understandably, the battery may generate gas in processes such as high-temperature cycling, overcharging, and over-discharging, consequently increasing the pressure inside the housing assembly 10. Moreover, the internal temperature of the battery rises after the gas is generated, which may even cause safety problems such as explosion and fire in severe cases. In this application, the elastic portion 1211 is disposed at the bottom plate 121 of the second housing 12. When the internal pressure of the housing assembly 10 increases, the elastic portion 1211 can elastically deform and switch to the second position, so as to electrically disconnect the elastic portion 1211 from the second electrode plate 212 (that is, electrically disconnect the electrode assembly 20 from an external circuit), thereby improving the safety of the battery 100.

In some embodiments, the elastic portion 1211 may be arc-shaped. The arc radius R of the elastic portion 1211 is adjustable depending on the width and thickness of the battery. When the electrode assembly 20 is tall and narrow, the value of R is relatively small. When the electrode assembly 20 is short and wide, the value of R is relatively large. The height of the arc-shaped elastic portion 1211 (that is, a distance from the highest point of the elastic portion 1211 to a plane containing the inner surface of the second housing 12 at the bottom side of the second housing) is ⅕ to ¹⁄₁₀₀ of the height of the second housing 12, where the thickness $T_4$ is 0.01 mm to 2 mm. This not only ensures that the elastic portion 1211 abuts and is electrically connected to the conductive assembly 30, but also makes the elastic portion 1211 occupy a smaller space, and improves the energy density.

In some embodiments, the material of the second housing 12 is metal. For example, the material of the second housing 12 may be stainless steel, nickel, aluminum, or the like.

Figure 6:
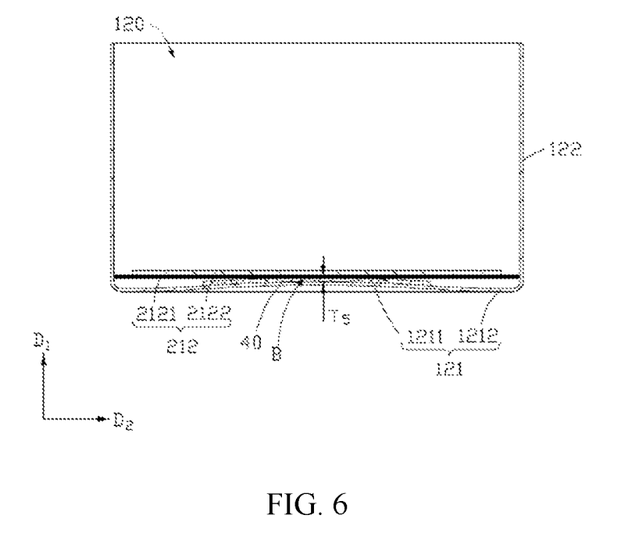
FIG. 6 is a sectional view of a battery sectioned at a second housing according to some other embodiments.

Referring to FIG. 6, in some other embodiments, a blocking piece 40 is disposed on the surface that is of the elastic portion 1211 and that faces the second electrode plate 212. The blocking piece 40 is capable of automatically blocking under a high temperature. When the battery 100 is working normally, the blocking piece 40 may be electrically connected to the second electrode plate 212 and the elastic portion 1211. When the electrode assembly 20 generates heat abnormally (that is, the internal temperature of the battery 100 rises to a preset value), the blocking piece 40 blocks the electrical connection between the second electrode plate 212 and the elastic portion 1211, thereby cutting off the electrical connection between the electrode assembly 20 and the second housing 12. Therefore, the safety of the battery 100 is further improved.

Further, the blocking piece 40 may be a positive temperature coefficient (PTC) thermistor. The resistance value of the PTC thermistor increases when the electrode assembly 20 generates heat abnormally, thereby blocking the electrical connection between the electrode assembly 20 and the second housing 12. The material of the PTC thermistor can be a ceramic-based material such as barium titanium oxide and aluminum oxide, or a polymer-based material such as crystalline polyolefin such as polyethylene or polypropylene. The PTC thermistor may be doped with metals such as nickel and manganese, or with conductive carbon black. In some embodiments, the thickness $T_5$ of the blocking piece 40 is 5 nm to 1.5 μm.

In some other embodiments, the second housing 12 may be a composite material compounded of a conductive material and a PTC material. In this way, the second housing 12 not only possesses conductivity to implement the electrical connection to the second electrode plate 212, but also is capable of automatically blocking under a high temperature. When the electrode assembly 20 generates heat abnormally, the second housing 12 can block the electrical connection from the second electrode plate 212, thereby improving safety. For example, the composite material may be compounded of a metal and ceramic, or compounded of a metal and a polymer. The metal may be nickel, manganese, or the like. The ceramic may be barium titanium oxide, aluminum oxide, or the like. The polymer may be crystalline polyolefin such as polyethylene or polypropylene. The composite material may be doped with conductive carbon black to improve the conductivity of the second housing 12.

In addition, the material of the first housing 11 may be a metal instead. The metal may be stainless steel, nickel, manganese, or the like. The first housing 11 may be fixed to the second housing 12 by welding. In other words, the first housing 11 is electrically connected to the second housing 12. In this case, the first housing 11 is dielectrically connected to the conductive assembly 30. With the electrical connection between the elastic portion 1211 and the second blank foil region B, the first housing 11 and the second housing 12 as a whole possess the same polarity as the second electrode plate 212.

Referring to FIG. 4 and FIG. 7, in some embodiments, the conductive assembly 30 includes a pedestal 31 and a protruding rod 32 disposed on the pedestal 31. Along a second direction $D_2$, where the second direction $D_2$ is defined as a direction perpendicular to the first direction $D_1$, the width $W_3$ of the pedestal 31 is greater than the width $W_1$ of the protruding rod 32. The first housing 11 is dielectrically connected to the conductive assembly 30, and the first housing 11 is provided with a through hole 110. The protruding rod 32 is disposed in the through hole 110. The pedestal 31 is disposed between the first housing 11 and the first electrode plate 211. The first blank foil region A of the first electrode plate 211 directly contacts the pedestal 31, thereby implementing the electrical connection between the first electrode plate 211 and the conductive assembly 30. The protruding rod 32 and the pedestal 31 may be integrally formed, or may be assembled together. The conductive assembly 30 includes the pedestal 31 that relatively wide, thereby ensuring the reliability of the electrical connection between the conductive assembly 30 and the first blank foil region A. In addition, in contrast to the traditional electrode post, this solution can reduce the short circuit hazards caused by the electrode post piercing the electrode plate 21 during a crush test. The cross-sectional shape of the through hole 110 may be a circle, an ellipse, a square, a triangle, a polygon, or the like. The cross-sectional shape of the protruding rod 32 is the same as the shape of the through hole 110. The diameter of the through hole 110 may be a value not greater than 100 mm.

Understandably, in other embodiments, the first housing 11 may be dielectrically connected to the second housing 12 instead. In this case, the first housing 11 may be electrically connected to the conductive assembly 30. With the electrical connection between the conductive assembly 30 and the first blank foil region A, the first housing 11 and the conductive assembly 30 as a whole possess the same polarity as the first electrode plate 211.

Further, in some embodiments, the battery 100 further includes an insulation piece 50 disposed between the first housing 11 and the conductive assembly 30. The insulation piece 50 is configured to bond the conductive assembly 30 to the first housing 11 to form a top cover of the housing assembly 10, thereby increasing the extent of integration of the top cover structure. In addition, the insulation piece 50 is further configured to electrically insulate the conductive assembly 30 from the first housing 11. In some embodiments, the insulation piece 50 includes a first insulation portion 51 and a second insulation portion 52 connected to the first insulation portion 51. The first insulation portion 51 is disposed in the through hole 110, and is configured to bond an outer wall of the protruding rod 32 and an inner wall of the through hole 110. The diameter of the through hole 110 may be slightly greater than the inner diameter of the first insulation portion 51. The inner diameter of the first insulation portion 51 may be slightly greater than or equal to the width $W_1$ of the protruding rod 32. The second insulation portion 52 is configured to bond a top surface of the pedestal 31 to the first housing 11, where the top surface is a surface on which the protruding rod 32 is disposed. The material of the insulation piece 50 includes at least one of polyolefin, polyvinyl chloride, or fluorine rubber. Optionally, the material of the insulation piece 50 may include non-polar polyolefin and insulation particles located in the non-polar polyolefin.

As shown in FIG. 7, in some embodiments, along the first direction $D_1$, the thickness $T_1$ of the first housing 11 is 0.1 mm to 2 mm. The thickness $T_2$ of the second insulation portion 52 of the insulation piece 50 is 0.01 mm to 1.0 mm. The thickness $T_3$ of the pedestal 31 of the conductive assembly 30 is 0.1 mm to 2 mm.

In some embodiments, along the second direction $D_2$, the width $W_5$ of the first housing 11 (that is, the width of the second housing 12) is greater than the width $W_4$ of the insulation piece 50. The width $W_4$ of the insulation piece 50 is greater than the width $W_3$ of the conductive assembly 30 (that is, the width of the pedestal 31). The width $W_3$ of the conductive assembly 30 may be slightly greater than the width $W_2$ of the first electrode plate 211.

Figure 8:
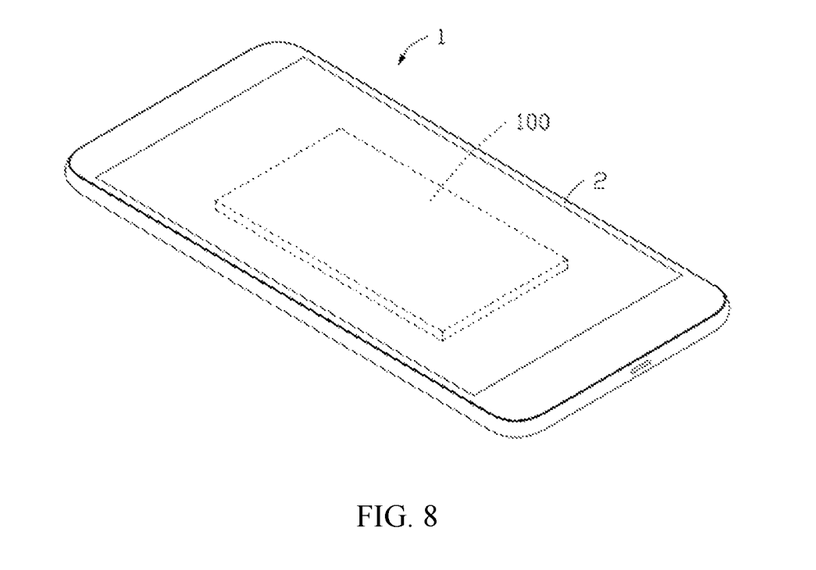
FIG. 8 is a schematic structural diagram of an electric device according to an embodiment of this application.

Referring to FIG. 8, this application further provides an electric device 1. The electric device 1 includes a main body 2 and the battery 100 disposed in the main body 2. In an embodiment, the electric device 1 according to this application may be, but is not limited to, a notebook computer, a pen-inputting computer, a mobile computer, an e-book player, a portable phone, a portable fax machine, a portable photocopier, a portable printer, a stereo headset, a video recorder, a liquid crystal display television set, a watch, a sports wristband, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game console, a power tool, a flashlight, a lithium-ion capacitor, or the like.

What is described above is merely exemplary embodiments of this application, but is not intended to limit this application. Any modifications, equivalent substitutions, and improvements made without departing from the spirit and principles of this application still fall within the protection scope of this application.

What is claimed is:

1. A battery, comprising:
   a housing assembly comprising a first housing and a second housing, wherein the first housing and the second housing are both conductive, the first housing is electrically connected to the second housing, and the first housing is fixed on the second housing, the second housing comprises a side wall and a bottom plate, the side wall and the bottom plate are connected, providing a cavity;
   an electrode assembly disposed in the cavity; and
   a conductive assembly;
   wherein,
   a part of the bottom plate is an elastic portion,
   the elastic portion protrudes toward the cavity and is elastically deformable;
   the electrode assembly comprises a plurality of stacked electrode plates, the plurality of stacked plates include a first electrode plate disposed at a top of the electrode assembly, and a second electrode plate disposed at a bottom of the electrode assembly,
   a surface of the first electrode plate facing away from a center of the electrode assembly contains a first blank foil region, and a surface of the second electrode plate facing away from the center of the electrode assembly contains a second blank foil region;
   the conductive assembly is electrically connected to the first blank foil region, and the elastic portion is abutted to and electrically connected to the second blank foil region; and
   wherein the elastic portion is configured to elastically deform and electrically disconnect from the second blank foil region when an internal pressure of the housing assembly increases.

2. The battery according to claim 1, wherein the elastic portion is arc-shaped.

3. The battery according to claim 1, wherein
   the bottom plate further comprises a connecting portion, and the connecting portion is connected to a side edge of the elastic portion; and,
   in a first direction that is defined as a stacking direction of the electrode plates, the elastic portion is disposed between the connecting portion and the electrode assembly.

4. The battery according to claim 1, further comprising a blocking piece, the blocking piece is disposed on a surface of the elastic portion facing the second electrode plate.

5. The battery according to claim 4, wherein the blocking piece comprises a positive temperature coefficient material.

6. The battery according to claim 1, wherein the second housing comprises a composite material formed of a conductive material and a positive temperature coefficient material.

7. The battery according to claim 1, further comprising an insulation piece, and the insulation piece is configured to bond the first housing and the conductive assembly.

8. The battery according to claim 1, wherein the conductive assembly comprises a pedestal and a protruding rod disposed on the pedestal, the first housing is provided with a through hole, the protruding rod is disposed in the through hole, and the pedestal is disposed between the first blank foil region and the first housing.

9. An electric device, comprising the battery according to claim 1.

10. The electric device according to claim 9, wherein the elastic portion is arc-shaped.

11. The electric device according to claim 9, wherein
    the bottom plate further comprises a connecting portion, and the connecting portion is connected to a side edge of the elastic portion; and,
    in a first direction that is defined as a stacking direction of the electrode plates, the elastic portion is disposed between the connecting portion and the electrode assembly.

12. The electric device according to claim 9, further comprising a blocking piece, the blocking piece is disposed on a surface of the elastic portion facing the second electrode plate.

13. The electric device according to claim 12, wherein the blocking piece comprises a positive temperature coefficient material.

14. The electric device according to claim 9, wherein the second housing comprises a composite material formed of a conductive material and a positive temperature coefficient material.

15. The electric device according to claim 9, further comprising an insulation piece, and the insulation piece is configured to bond the first housing and the conductive assembly.

16. The electric device according to claim 9, wherein the conductive assembly comprises a pedestal and a protruding rod disposed on the pedestal, the first housing is provided with a through hole, the protruding rod is disposed in the through hole, and the pedestal is disposed between the first blank foil region and the first housing.

17. The battery according to claim 6, wherein the composite material is configured to block the electrical connection from the second electrode plate when the electrode assembly generates heat abnormally.

* * * * *